United States Patent
Somasundaram et al.

(10) Patent No.: US 11,269,685 B2
(45) Date of Patent: Mar. 8, 2022

(54) MANAGING MEMORY BUFFER ALLOCATION IN MULTI-PROCESSOR SYSTEM

(71) Applicant: International Business Machines Corporation, Armonk, NY (US)

(72) Inventors: Muruganandam Somasundaram, Poughkeepsie, NY (US); Jeffrey Paul Kubala, Poughquag, NY (US); Jerry A. Moody, LaGrangeville, NY (US); Hunter J. Kauffman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 16/447,119

(22) Filed: Jun. 20, 2019

(65) Prior Publication Data

US 2020/0401451 A1    Dec. 24, 2020

(51) Int. Cl.
  *G06F 9/46*    (2006.01)
  *G06F 9/50*    (2006.01)
  (Continued)

(52) U.S. Cl.
  CPC ........ *G06F 9/5016* (2013.01); *G06F 9/45558* (2013.01); *G06F 12/023* (2013.01);
  (Continued)

(58) Field of Classification Search
  CPC .. G06F 9/5016; G06F 9/45558; G06F 12/023; G06F 2009/45583; G06F 2209/5022; G06F 2212/6042
  (Continued)

(56) References Cited

U.S. PATENT DOCUMENTS

| 5,721,876 A | * | 2/1998 | Yu ........................ G06F 9/45537 |
| | | | 703/27 |
| 8,688,923 B2 | | 4/2014 | Jacobs et al. |

(Continued)

OTHER PUBLICATIONS

IPCOM000225155D; "DMA-Aware User Space Memory Buffer Allocation", An IP.com Prior Art Database Technical Disclosure, IP.com No. IPCOM000225155D, IP.com Electronic Publication Date: Jan. 28, 2013, 3 pps.

(Continued)

*Primary Examiner* — Bradley A Teets
(74) *Attorney, Agent, or Firm* — Stephanie L. Carusillo

(57) ABSTRACT

In an approach for managing physical processor usage of a shared memory buffer, a processor receives a request for memory. A processor receives a request for memory from a process running on a physical processor. A processor determines whether the request for memory is less than or equal to a pre-determined threshold, wherein the pre-determined threshold is based on characteristics of a server on which the physical processor resides, needs of the server, and a frequency of requests of each memory size. Responsive to determining the request for memory is greater than the pre-determined threshold, a processor identifies a node on which the physical processor resides. A processor identifies a memory buffer of a set of memory buffers allocated to the node on which the physical processor resides. A processor allocates the memory buffer.

20 Claims, 4 Drawing Sheets

(51) Int. Cl.
*G06F 12/02* (2006.01)
*G06F 9/455* (2018.01)
(52) U.S. Cl.
CPC ............. *G06F 2009/45583* (2013.01); *G06F 2209/5022* (2013.01); *G06F 2212/6042* (2013.01)
(58) Field of Classification Search
USPC ........................................................ 718/104
See application file for complete search history.

(56) References Cited

U.S. PATENT DOCUMENTS

| | | | |
|---|---|---|---|
| 9,081,501 | B2 | 7/2015 | Asaad et al. |
| 9,325,742 | B1* | 4/2016 | Barsness ............... H04L 63/20 |
| 9,495,107 | B2 | 11/2016 | Bronson et al. |
| 9,971,713 | B2 | 5/2018 | Asaad et al. |
| 10,210,109 | B2 | 2/2019 | Kubala |
| 10,223,301 | B2 | 3/2019 | Kubala |
| 2018/0052765 | A1* | 2/2018 | Imbierski ............. G06F 12/023 |
| 2018/0150223 | A1* | 5/2018 | Kubala ............... G06F 13/1673 |
| 2018/0150417 | A1* | 5/2018 | Kubala .................. G06F 5/065 |

OTHER PUBLICATIONS

IPCOM000229293D; "Low Latency Kernel-Level Interpartition Communications via Shared-Memory IO", An IP.com Prior Art Database Technical Disclosure, IP.com No. IPCOM000229293DIP. com Electronic Publication Date: Jul. 18, 2013, 6 pps.

IPCOM000249125D; "Method for Tracking Association of Tasks and Its Memory References in Order to Improve Locality of References in a NUMA System", An IP.com Prior Art Database Technical Disclosure, IP.com No. IPCOM000249125D, IP.com Electronic Publication Date: Feb. 8, 2017, 5 pps.

Moniruzzaman, ABM; "Analysis of Memory Ballooning Technqiue for Dynamic Memory Management of Virtual Machines (VMS)", printed on May 28, 2019, 11 pps.

Qian, J. et al.; "Topology-Aware Virtual Resource Management for Heterogeneous Multi-Core Systems", Design, Automation And Test in Europe (Date 2018), pp. 177-182.

Quintera, D. et al; "Power Systems Enterprise Servers With Power VM Virtualization and RAS", IBM.com/redbooks, IBM, Published Dec. 15, 2011, 424 pps.

Raj, H. et al.; "Virtualization Services: Accelerated I/O Support in Multi-Core Systems", printed on May 28, 2019, 17 pps.

\* cited by examiner

MANAGING MEMORY BUFFER ALLOCATION IN MULTI-PROCESSOR SYSTEM

BACKGROUND

The present invention relates generally to the field of processor memory allocation, and more particularly to managing physical processor usage of a shared memory buffer.

A virtual machine (VM) is an emulation of a computer system. VMs are based on computer architectures and provide the functionality of a physical computer. VM implementations may involve specialized hardware, software, or a combination. A system VM provides a substitute for a real machine and provides the functionality needed to execute entire operating systems. A hypervisor is computer software, firmware, or hardware that creates and runs VMs. There are two types of hypervisors: type-1, native or bare-metal hypervisors and type-2 or hosted hypervisors. Type-1 hypervisors run directly on the host's hardware (e.g., a server) to control the hardware and to manage guest operating systems.

A memory buffer, also called a data buffer or just a buffer, is a region of memory used to temporarily hold data while the data is being moved from one place to another within a computer. Typically, the data is stored in a memory buffer as it is retrieved from an input device or just before it is sent to an output device. A hypervisor process executing on a physical processor may require memory buffers to store work variables. Requests for memory buffers occur quite frequently and the size of the memory buffer requested can vary from 8 bytes to 4096 bytes.

SUMMARY

Aspects of an embodiment of the present invention disclose a method, computer program product, and computer system for managing physical processor usage of a shared memory buffer. A processor receives a request for memory from a process running on a physical processor. A processor determines whether the request for memory is less than or equal to a pre-determined threshold, wherein the pre-determined threshold is based on characteristics of a server on which the physical processor resides, needs of the server, and a frequency of requests of each memory size. Responsive to determining the request for memory is greater than the pre-determined threshold, a processor identifies a node on which the physical processor resides. A processor identifies a memory buffer of a set of memory buffers allocated to the node on which the physical processor resides. A processor allocates the memory buffer.

DETAILED DESCRIPTION

Figure 1A:
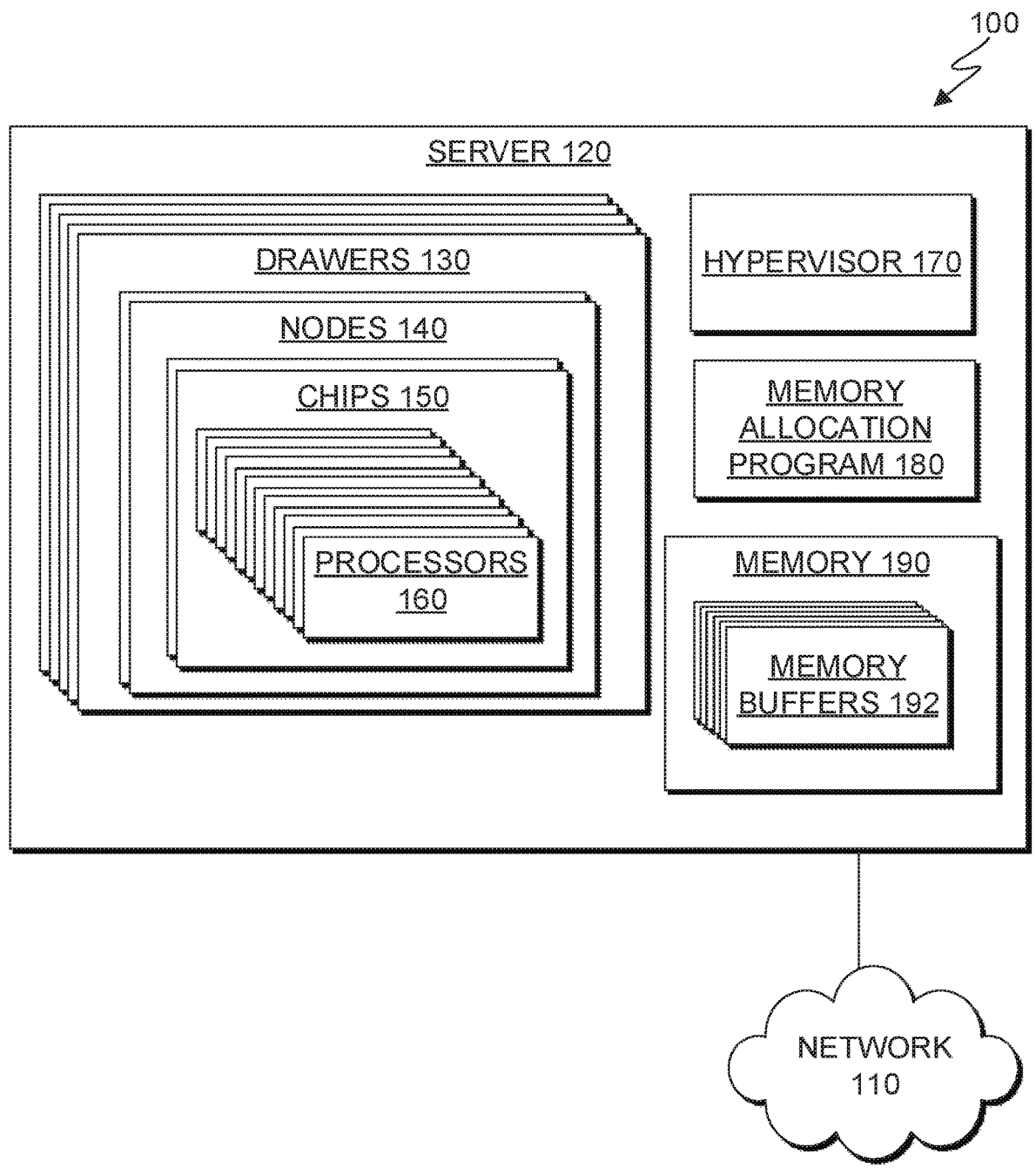
FIG. 1A depicts a functional block diagram of a multi-processor computing environment, in accordance with an embodiment of the present invention.

Embodiments of the present invention recognize that a hypervisor process executing on a physical processor may require memory buffers to store work variables. Requests for memory buffers occur quite frequently and the size of the memory buffer requested can vary from 8 bytes to 4096 bytes and possibly even greater amounts. In one embodiment, a server system running the hypervisor can comprise one to five drawers, two nodes in each drawer, two chips on each node, and up to twelve physical processors on each chip. In such an embodiment, up to two hundred forty physical processors could have to contend for memory buffers of the system. In one embodiment, each physical processor is provided a set of memory buffers, ("local memory buffers"), but this set of local memory buffers can only support up to some threshold of memory, e.g., up to 128 bytes. The metadata associated with the set of memory buffers for a given physical processor is maintained as a bitmap, a type of memory organization, with a one-to-one relationship between the bitmap and the physical processor. For memory requests greater than the threshold, e.g., 128 bytes, the hypervisor must use older algorithms (e.g., single-threaded processes), so there is a need for an improved system.

Embodiments of the present invention provide a set of memory buffers for each node, ("node-level memory buffers"), such that a physical processor on a given node will use the set of memory buffers associated with that node. Thus, instead of all the physical processors on the system competing for a memory buffer of all the system memory buffers, the physical processors on a given node will compete only for a memory buffer of the set of memory buffers for that node. In one embodiment, node-level memory buffer sizes can include 1024, 2048, and 4096 bytes. In other embodiments, node-level memory buffer sizes can be any size. Node-level memory buffers are managed using a bitmap with a one-to-one relationship between a node and bitmaps associated with the set of memory buffers for that node. Embodiments of the present invention significantly reduce contention for memory buffers during process execution by providing a set of memory buffers for a set of physical processors (e.g., physical processors on a node, physical processors on a chip, or a smaller subset of physical processors).

Embodiments of the present invention provide a program for allocating a memory buffer to a physical processor based on the size of the memory request. If the size of the memory request by a given physical processor is less than or equal to a threshold, e.g., 128 bytes, then the program allocates the memory requested from a local memory buffer associated with that physical processor. If the size of the memory request by a given physical processor is greater than the threshold, e.g., 128 bytes, then the program identifies the node on which the physical processor resides and allocates the memory requested from a node-level memory buffer associated with the identified node.

The present invention will now be described in detail with reference to the Figures.

FIG. 1A depicts a functional block diagram illustrating multi-processor computing environment 100, in accordance with an embodiment of the present invention. FIG. 1 provides only an illustration of one embodiment of the present invention and does not imply any limitations with regard to the environments in which different embodiments may be implemented. In the depicted embodiment, multi-processor computing environment 100 includes server 120 connected to network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between server 120 and another computing device (not shown). Multi-processor computing environment 100 may include additional servers, computers, or other devices not shown.

Server 120 operates as a multi-processor computing system with drawers 130, nodes 140, chips 150, processors 160, hypervisor 170, memory allocation program 180, and memory 190. In some embodiments, server 120 may be a management server, a web server, or any other electronic device or computing system capable of receiving and sending data. Hypervisor 170 operates as program to manage the collection of resources of server 120 to implement logical partitions or virtual machines. In the depicted embodiment, server 120 comprises a set of five drawers 130, a set of two nodes 140 on each drawer 130, a set of two chips 150 on each node 140, and a set of twelve processors 160 on each chip 150. In other embodiments, server 120 may have any different number of drawers 130, nodes 140, chips 150, and processors 160. Server 120 may include components as described in further detail in FIG. 3.

Drawers 130 operate as a collection of one or more nodes, such as nodes 140. In the depicted embodiment, server 120 comprises five drawers 130, and each drawer 130 has two nodes 140. In other embodiments, server 120 may have any different number of drawers 130. In an embodiment, drawers 130 have a dedicated cache shared among nodes 140 and/or a communication bus interconnecting nodes 140 of a drawer of drawers 130. In an embodiment with more than one drawer 130, there is a communication bus between drawers 130 to communicate off drawer, at typically slower speeds than on drawer communication.

Nodes 140 operate as a collection of one or more chips, such as chips 150. In the depicted embodiment, each drawer 130 comprises two nodes 140, and each node 140 comprises two chips 150. In other embodiments, server 120 may have any different number of nodes 140. In an embodiment, nodes 140 have a communication bus interconnecting chips 150 and have a dedicated cache shared among chips 150.

Chips 150 operate as a collection of one or more central processing units (CPUs), such as processors 160. In the depicted embodiment, each node 140 comprises two chips 150, and each chip 150 comprises twelve processors 160. In other embodiments, server 120 may have any different number of chips 150. In an embodiment, chips 150 share some amount of high-speed local cache with high speed communication bus between the CPUs on the same chip.

Processors 160 operate as general-purpose engines that execute a set of instructions from a program, e.g., a hypervisor, such as hypervisor 170. In the depicted embodiment, each chip 150 comprises twelve processors 160. In other embodiments, server 120 may have any different number of processors 160.

Memory 190 operates as place to hold one or more programs with computer readable program instructions and data that processors 160 can act on directly. In the depicted embodiment, memory 190 comprises memory buffers 192. Subsets of memory buffers 192 can be allocated to a specific physical processor of processors 160, a set of physical processors of processors 160, a node of nodes 140, or any other subset of processors 160. In other embodiments, memory 190 may have any different number of memory buffers and sets of memory buffers. In an embodiment, the metadata associated with a set of memory buffers for a given physical processor is maintained as a bitmap and stored in memory 190 with a one-to-one relationship between the bitmap and the physical processor. In an embodiment, the metadata associated with a set of memory buffers for a given node is maintained as a bitmap and stored in memory 190 with a one-to-one relationship between the node and bitmaps associated with the set of memory buffers for that node. An example embodiment of memory 190 and memory buffers 192 is described in further detail in FIG. 1B.

Memory allocation program 180 operates as a program for managing memory allocation between physical processors in a multi-processor computing system. In an embodiment, memory allocation program 180 receives a request for memory, determines whether the request for memory is less than or equal to a pre-determined threshold, allocates a memory buffer accordingly, and updates the metadata for the memory buffer. In the depicted embodiment, memory allocation program 180 resides on server 120. In other embodiments, memory allocation program 180 may reside within hypervisor 170 or on another computing device (not shown), provided that memory allocation program 180 has access to server 120 via network 110.

Figure 1B:
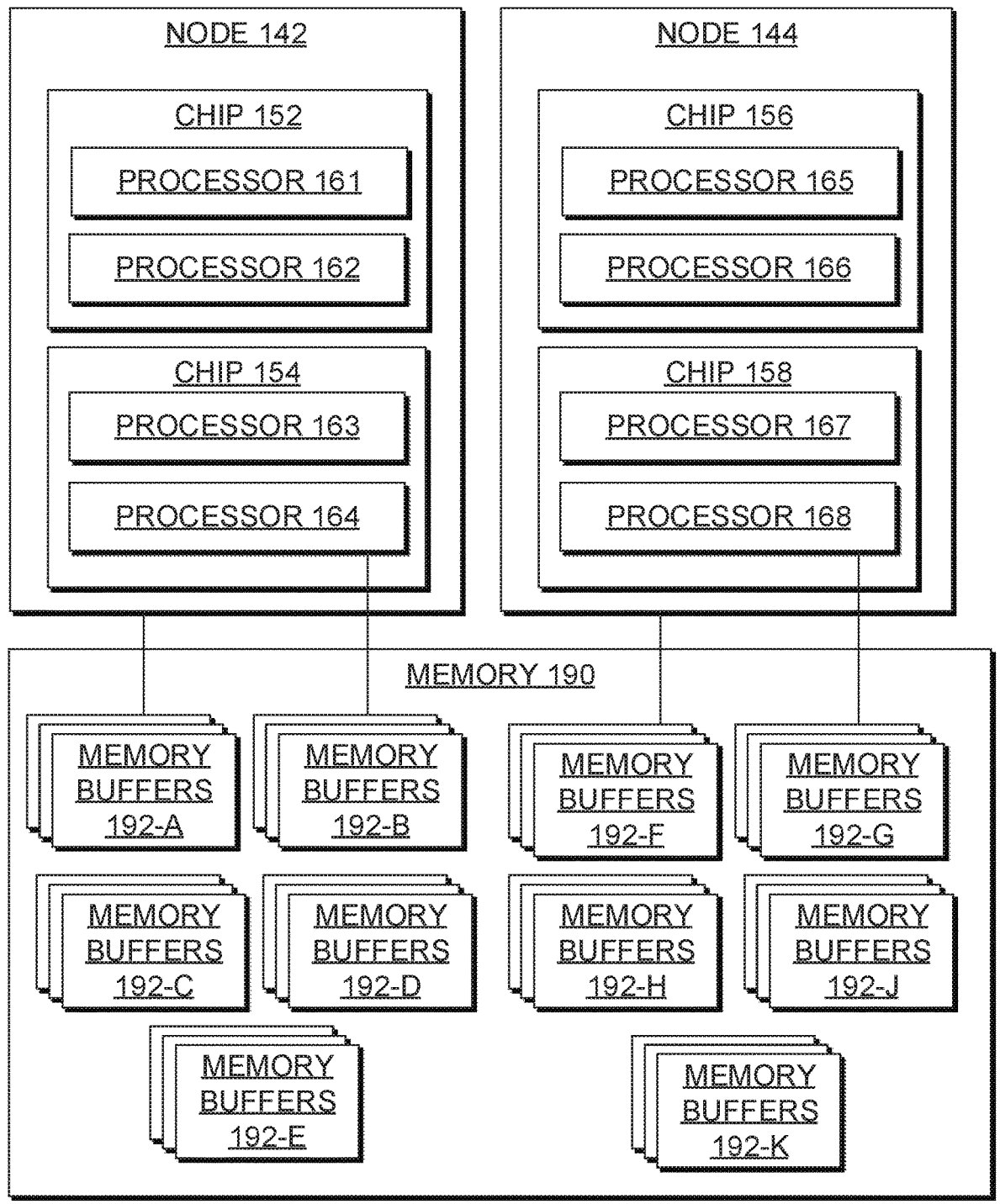
FIG. 1B depicts a functional block diagram illustrating components of multi-processor computing environment 100, in accordance with an embodiment of the present invention.

FIG. 1B depicts a block diagram highlighting components of server 120 of multi-processor computing environment 100, in accordance with one embodiment of the present invention in which each chip 150 of server 120 contains two processors 160. In the depicted embodiment, node 142 is similar to nodes 140 and includes chip 152 and chip 154 that are a subset of and similar to chips 150. Chip 152 includes processors 161 and processor 162 that are a subset of and similar to processors 160. Chip 154 includes processors 163 and processor 164 that are a subset of and similar to processors 160. In the depicted embodiment, node 144 is similar to nodes 140 and includes chip 156 and chip 158 that are a subset of and similar to chips 150. Chip 156 includes processors 165 and processor 166 that are a subset of and similar to processors 160. Chip 158 includes processors 167 and processor 168 that are a subset of and similar to processors 160.

In the depicted embodiment, memory 190 contains multiple sets of memory buffers depicted as memory buffers 192-A, 192-B, 192-C, 192-D, 192-E, 192-F, 192-G, 192-H, 192-J, and 192-K. In the depicted embodiment, node 142 is allocated a set of memory buffers, memory buffers 192-A. In the depicted embodiment, node 144 is allocated a set of memory buffers, memory buffers 192-F. Memory buffers that are allocated to a node, such as memory buffers 192-A and memory buffers 192-F, are managed using a bitmap with a one-to-one relationship between the node and bitmaps associated with the set of memory buffers for that node.

In the depicted embodiment, each physical processor is allocated a set of memory buffers. Memory buffers 192-C are allocated to processor 161. Memory buffers 192-D are allocated to processor 162. Memory buffers 192-E are allocated to processor 163. Memory buffers 192-B are allocated to processor 164. Memory buffers 192-H are allocated to processor 165. Memory buffers 192-J are allocated to processor 166. Memory buffers 192-K are allocated to processor 167. Memory buffers 192-G are allocated to processor 168. For simplification, FIG. 1B only depicts a connection from memory buffers 192-B to processor 164 and memory buffers 192-G to processor 168, but it should be appreciated that each processor is allocated a set of memory buffers in memory 190. Metadata associated with a set of memory buffers for a given physical processor, such as memory buffers 192-B, is maintained as a bitmap with a one-to-one relationship between the bitmap and the physical processor.

Figure 2:
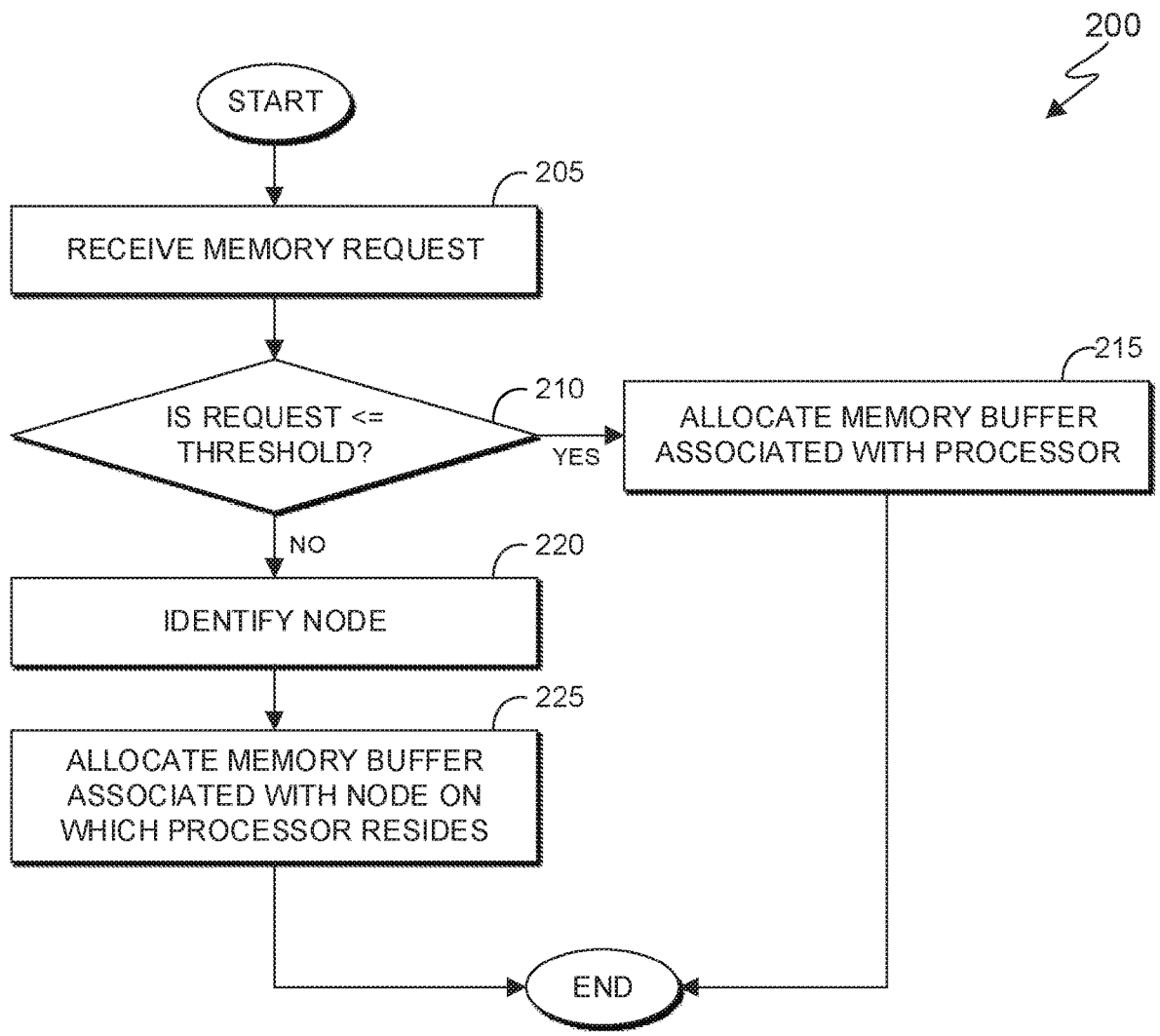
FIG. 2 depicts a flow chart of the steps of a memory allocation program, in accordance with an embodiment of the present invention.

FIG. 2 depicts a flowchart 200 of the steps of memory allocation program 180, in accordance with an embodiment of the present invention. In an embodiment, memory allocation program 180 receives a request for memory, determines whether the request is less than or equal to a pre-determined threshold, allocates a memory buffer accordingly, and updates the metadata for the memory buffer. It should be appreciated that the process depicted in FIG. 2 illustrates one possible iteration of the process flow, which repeats for each memory request received by memory allocation program 180.

In step 205, memory allocation program 180 receives a request for memory. In an embodiment, memory allocation program 180 receives a request for memory from a process (i.e., a hypervisor process) running on a physical processor that needs memory for work variables related to the process. In an embodiment, memory allocation program 180 receives a request for memory that includes metadata with a size of memory requested and metadata with the node on which the physical processor resides.

In decision 210, memory allocation program 180 determines whether the request for memory is less than or equal to a pre-determined threshold. In an embodiment, memory allocation program 180 determines whether the request for memory is less than or equal to a pre-determined threshold based on the size of memory metadata in the request. For example, if the pre-determined threshold is 128 bytes and the request for memory is for 256 bytes, then memory allocation program 180 determines that the request for memory is greater than the pre-determined threshold. In an embodiment, the threshold is determined based on characteristics of server 120, such as how many drawers 130, nodes 140, chips 150, and processors 160 are included and/or what size and/or amount of memory buffers are available. In an embodiment, the threshold is determined based on needs of hypervisor 170 running on server 120. In an embodiment, the threshold is determined based on a frequency of requests of each memory size. For example, in an embodiment in which most requests for memory are less than or equal to 128 bytes, the threshold is determined to be 128 bytes. In some embodiments, the threshold is determined based on any combination of these factors.

If memory allocation program 180 determines the request for memory is less than or equal to the pre-determined threshold (decision 210, YES branch), then memory allocation program 180 proceeds to step 215. If memory allocation program 180 determines the request for memory is greater than the pre-determined threshold (decision 210, NO branch), then memory allocation program 180 proceeds to step 220.

In step 215, memory allocation program 180 allocates the memory buffer associated with the physical processor for the memory requested. In an embodiment, memory allocation program 180 allocates the memory buffer associated with the physical processor for the memory requested by identifying an available memory buffer of the size requested within the set of memory buffers associated with the physical processor that is running the process that sent the request. In an embodiment, memory allocation program 180 identifies the memory buffer using the metadata for the set of memory buffers. In an embodiment, memory allocation program 180 atomically updates the metadata for the memory buffer to reflect the allocation by updating the bitmap associated with the physical processor. In an embodiment, memory allocation program 180 clears the memory buffer and returns control back to the process running on the physical processor with an address of the memory buffer.

In step 220, memory allocation program 180 identifies a node on which the physical processor running the process that sent the request resides. In an embodiment, memory allocation program 180 identifies the node on which the physical processor resides by reviewing metadata received with the request (step 205) for information on the node on which the physical processor resides.

In step 225, memory allocation program 180 memory allocation program 180 allocates the memory buffer associated with the node on which the physical processor resides for the memory requested. In an embodiment, memory allocation program 180 allocates the memory buffer associated with the node by identifying an available memory buffer of the size requested within the set of memory buffers allocated to the identified node. In an embodiment, memory allocation program 180 identifies the memory buffer using the metadata for the set of memory buffers. In an embodiment, memory allocation program 180 atomically updates the metadata for the memory buffer to reflect the allocation by updating the bitmap associated with the node. In an embodiment, memory allocation program 180 clears the memory buffer and returns control back to the process running on the physical processor with an address of the memory buffer.

Figure 3:
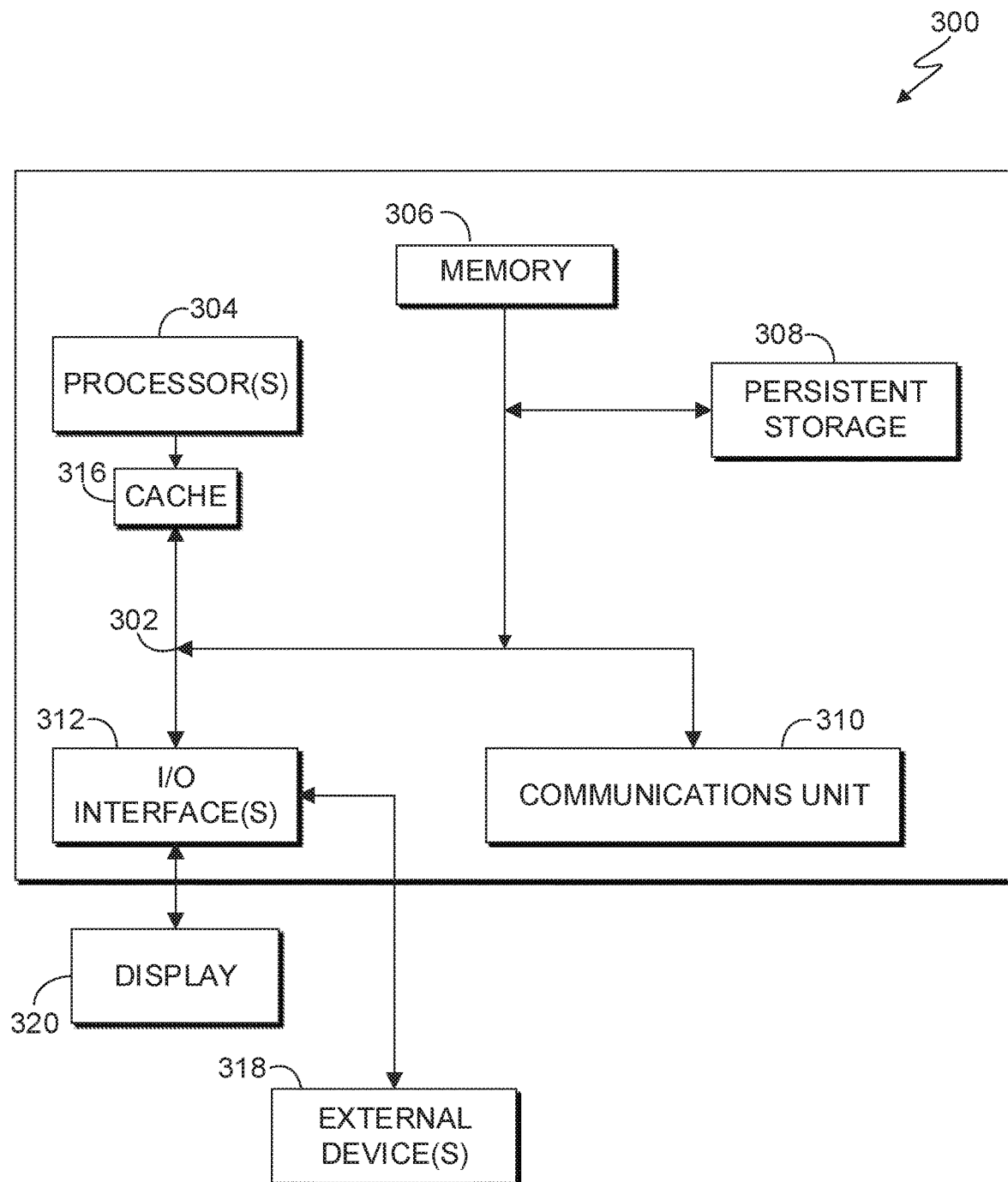
FIG. 3 depicts a block diagram of a server of multi-processor computing environment, in accordance with an embodiment of the present invention.

FIG. 3 depicts a block diagram of computer 300 suitable for server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Memory allocation program 180 may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs, such as memory allocation program 180, may be downloaded to persistent storage 308 through communications unit 310.

I/O interface(s) 312 allows for input and output of data with other devices that may be connected to server 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Memory allocation program 180 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving a request for memory from a process running on a physical processor, wherein the request comprises metadata with a size of memory requested and a node on which the physical processor resides;
   determining whether the size of memory requested is less than or equal to a pre-determined threshold, wherein the pre-determined threshold is based on characteristics of a server on which the physical processor resides and a frequency of requests for memory of each memory size;
   determining whether to allocate a memory buffer from a set of memory buffers allocated to the physical processor or a separate set of memory buffers allocated to the node on which the physical processor resides based on the determination of whether the size of memory requested is less than or equal to the pre-determined threshold; and
   allocating the memory buffer based on the determination of whether to allocate the memory buffer from the set of memory buffers allocated to the physical processor or the separate set of memory buffers allocated to the node.

2. The computer-implemented method of claim 1, wherein the set of memory buffers allocated to the node are managed using a bitmap for each memory buffer of the set of memory buffers with a one-to-one relationship between the node and each bitmap associated with the set of memory buffers for the node.

3. The computer-implemented method of claim 1, further comprising updating metadata of the memory buffer to reflect that the memory buffer has been allocated.

4. The computer-implemented method of claim 1, further comprising:
   responsive to allocating the memory buffer, clearing the memory buffer.

5. The computer-implemented method of claim 4, further comprising:
   responsive to clearing the memory buffer, returning control to the process and an address of the memory buffer.

6. The computer-implemented method of claim 1, wherein the process is a hypervisor process.

7. The computer-implemented method of claim 1, wherein the server comprises a set of drawers, a set of nodes, a set of chips, and a set of physical processors.

8. A computer program product comprising:
   one or more computer readable storage media and program instructions stored on the one or more computer readable storage media, the program instructions comprising:
   program instructions to receive a request for memory from a process running on a physical processor, wherein the request comprises metadata with a size of memory requested and a node on which the physical processor resides;
   program instructions to determine whether the size of memory requested is less than or equal to a pre-determined threshold, wherein the pre-determined threshold is based on characteristics of a server on which the physical processor resides and a frequency of requests for memory of each memory size;
   determining whether to allocate a memory buffer from a set of memory buffers allocated to the physical processor or a separate set of memory buffers allocated to the node on which the physical processor resides based on the determination of whether the size of memory requested is less than or equal to the pre-determined threshold; and
   program instructions to allocate the memory buffer based on the determination of whether to allocate the memory buffer from the set of memory buffers allocated to the physical processor or the separate set of memory buffers allocated to the node.

9. The computer program product of claim 8, wherein the set of memory buffers allocated to the node are managed using a bitmap for each memory buffer of the set of memory buffers with a one-to-one relationship between the node and each bitmap associated with the set of memory buffers for the node.

10. The computer program product of claim 8, further comprising program instructions to update metadata of the memory buffer to reflect that the memory buffer has been allocated.

11. The computer program product of claim 8, further comprising:
    responsive to the program instructions to allocate the memory buffer, program instructions to clear the memory buffer.

12. The computer program product of claim 11, further comprising:

responsive to the program instructions to clear the memory buffer, program instructions to return control to the process and an address of the memory buffer.

13. The computer program product of claim 8, wherein the process is a hypervisor process.

14. The computer program product of claim 8, wherein the server comprises a set of drawers, a set of nodes, a set of chips, and a set of physical processors.

15. A computer system comprising:
one or more computer processors;
one or more computer readable storage media; and
program instructions stored on the computer readable storage media for execution by at least one of the one or more processors, the program instructions comprising:
program instructions to receive a request for memory from a process running on a physical processor, wherein the request comprises metadata with a size of memory requested and a node on which the physical processor resides;
program instructions to determine whether the size of memory requested is less than or equal to a pre-determined threshold, wherein the pre-determined threshold is based on characteristics of a server on which the physical processor resides and a frequency of requests for memory of each memory size;
determining whether to allocate a memory buffer from a set of memory buffers allocated to the physical processor or a separate set of memory buffers allocated to the node on which the physical processor resides based on the determination of whether the size of memory requested is less than or equal to the pre-determined threshold; and
program instructions to allocate the memory buffer based on the determination of whether to allocate the memory buffer from the set of memory buffers allocated to the physical processor or the separate set of memory buffers allocated to the node.

16. The computer system of claim 15, wherein the set of memory buffers allocated to the node are managed using a bitmap for each memory buffer of the set of memory buffers with a one-to-one relationship between the node and each bitmap associated with the set of memory buffers for the node.

17. The computer system of claim 15, further comprising program instructions to update metadata of the memory buffer to reflect that the memory buffer has been allocated.

18. The computer system of claim 15, further comprising:
responsive to the program instructions to allocate the memory buffer, program instructions to clear the memory buffer; and
responsive to the program instructions to clear the memory buffer, program instructions to return control to the process and an address of the memory buffer.

19. The computer system of claim 15, wherein the process is a hypervisor process.

20. The computer system of claim 15, wherein the server comprises a set of drawers, a set of nodes, a set of chips, and a set of physical processors.

* * * * *